Dec. 26, 1967  M. AUDEBERT  3,359,655
TEACHING-AID DEVICE
Filed April 19, 1965  3 Sheets-Sheet 1

Fig.1.

Inventor
Michel Audebert
By Stevens, Davis, Miller & Mosher
Attorneys

Fig. 2

Inventor
Michel Audebert
By Stevens, Davis, Miller & Mosher
Attorneys

Fig.3.

3,359,655
TEACHING-AID DEVICE

Michel Audebert, Paris, France, assignor to Laboratoires d'Electronique et de Physique Appliquees, Paris, France
Filed Apr. 19, 1965, Ser. No. 449,215
Claims priority, application France, Apr. 22, 1964, 971,873
9 Claims. (Cl. 35—48)

The present invention relates to an electrical teaching-aid device affording to the teacher a possibility to check and analyze the knowledge acquired by the pupils and to impart, if advisable, a new trend to his exposition according to the results obtained.

A conventional teaching-aid device consists of a system wherein the teacher and pupils each have at disposal a desk provided with a hand-operated answer-selector switch adapted to assume several positions, said desk being respectively called the Teacher-desk and Pupil-desks. There is provided a display panel, made of indicator elements which are arranged along rows or lines and columns. Each element, which corresponds but to a single type of pupil answer to a question, is connected to the Teacher-desk selector switch on the one hand and to the selector switch of one of said Pupil-desks on the other hand. A plurality of elements connected to a single pupil selector are adapted to record all the answers of one pupil to a single question, such a group of elements being called a cell. The plurality of cells connected to one position of the teacher selector switch is adapted to indicate to the teacher the answers of all the pupils to one question; the plurality of cells connected to a single pupil selector is adapted to indicate the answers of a single pupil to a plurality of questions.

However, the known devices have the disadvantage that they do not allow the pupil to gauge or "weigh" his answer, that is to assign a value to a proposed answer. Moreover, the known devices are not capable of storing the pupil answers, this being liable to be detrimental to the orderly progress of the teacher's work. The indicator unit which, in this case, is of the visual type, allows for errors in the counting of the answers and does not afford a written statement setting forth the various results acquired in the course of one class, and this may be a further inconvenience.

The present invention has for its purpose to obviate the inconveniences by making it possible for the pupils to select a type of answer among several proposed answers and for the teacher to keep the pupil answers available, either by being stored in the device according to the invention itself, with a view to be subsequently processed, or by being written down, after display, on a physical base such as a paper strip, wherefrom they cannot be unintentionally deleted.

The teaching-aid device according to the invention, includes a desk called teacher-desk, provided with a hand-operated selector switch having several positions, which allows the teacher to select an answer among a plurality of proposed answers to a question put to the pupils, pupil-desks each provided with a hand-operated answer-selector having several positions and which allows a pupil to select his answer among those proposed, and a result-reading unit and further includes:

A so-called question register of the step-by-step shifting type, having one input and several outputs, whereof only one can be fed at a time, each output corresponding to one single question, A so-called register of the step-by-step shifting type, having one input and several outputs, whereof only one can be fed at a time, each output corresponding to one single pupil.

A central memory unit formed of memory cells, each of which is adapted to contain the answer of a pupil to a question and is connected, on the one hand, to one output of the question register, on the other hand, to one output of the pupil register and finally to one of said answer selectors, the plurality of cells connected to a common output of the question register being called a section and being adapted to record or read the answers of every pupil to a same question, the plurality of cells connected to a common output of the pupil register being called a group and being adapted to register or read the answers of one single pupil to several questions, An equality detector connected, on the one hand, through the pupil- and question-registers, to the memory unit and, on the other hand, to the answer selector of the teacher desk, being adapted to compare every pupil answer with the homologous answer of the teacher, said detector supplying an indication of each identity therebetween, A comparing and valuing unit connected, through the question- and pupil-registers, on the one hand, to the cell group fed with the teacher's answers and, on the other hand, to the cell groups fed with the pupils' answers, being adapted to compare the pupil's answer with the corresponding teacher's answer and to supply, as a function of this comparison, a weighed indication of the value of the pupil's answer, A programming unit, connected to the plurality of said units, registers and equality detector, adapted to sequentially control the various stages of transfer and conversion of the data.

The device according to the invention may operate at the teacher's will in several different modes, namely either under "checking routine" or under "general questioning routine" conditions.

In the "checking routine" mode, which consists in submitting to the pupils in the class as a whole a single question with several attendant answers, whereof only one is correct, each pupil is called on to select one of said answers. On a display device, there will appear in line the answers of each pupil as well as the number of said answers pertaining to the same type as that which the teacher is to consider.

A precise example will afford a better understanding of the "checking routine" and of the various stages in the operation of the device according to the invention.

During a class of grammar, the teacher gives to his pupils, which may for example be fifteen in number, the definition of the direct object of verb. He therefore submits to them a sentence such as: "Jack gave Peter's marbles to Paul" and, the terms such as: Jack, marbles, Paul, Peter being called A.B.C.D. respectively, he proposes to them four answers among which only one is correct.

The teacher then asks which term in the sentence is the direct object of the verb. By allotting a thinking time e.g. of thirty seconds, the teacher may meanwhile study the pupils' response time (necessary to answer) by causing the device to display the answers of those pupils which have already positioned their answer selector switch within a time shorter than that allowed. The answers will for example be printed on a strip of paper, together with the number of correct answers.

Thus, the displayed answers will be of the type:

within 10 seconds BB . . . A . BC . B . . . B  5B
within 20 seconds BBD . CB . BC . BB . . . B  7B
within 30 seconds BBD DCB . BCBBADB  8B Having thus obtained eight correct answers from fifteen, the teacher may choose to give some further explanation and may orient or direct the latter by noticing, among others, that:

the most frequent error was the answer D
the good answers were but slowly expressed
the pupil having his results displayed at the 7th position failed to answer within the allotted time and will have to be more especially attended to.

In a "general questioning routine," consisting in putting to the pupils as a whole a plurality of questions, each pupil is to give his appreciation according to a preset code, which may be as follows:

(a) the answer is correct
(b) the answer is wrong
(c) the answer is probably correct
(d) the answer is probably wrong.

Thereafter, the point is to estimate or value each of the answers given by the pupil with respect to the corresponding correct answer, four possible marks being provided for each type of answer, and to assign one mark to each answer.

The final mark for a pupil is obtained by totaling all the partial marks assigned to the successive questions. The device then prints along one line all the answers of the pupil as well as the obtained mark. The process is then repeated for every pupil in the class.

Further features of the invention will be more clearly apparent from the following description given, by way of nonrestrictive example, with reference to the accompanying drawings, wherein.

Figure 3:
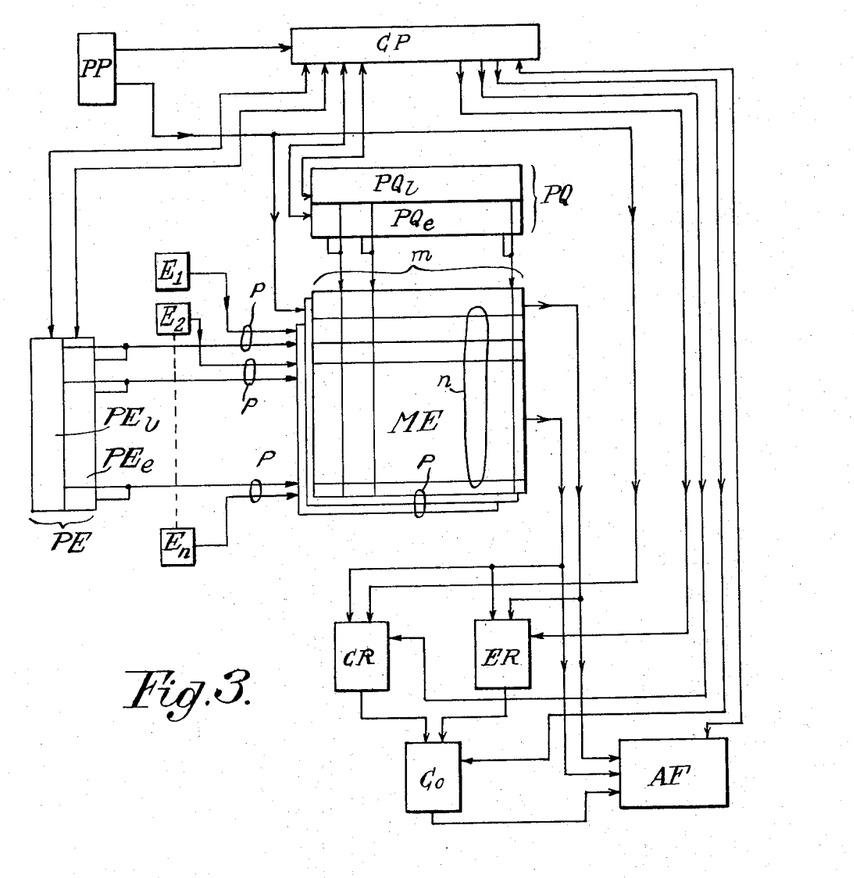
FIGURE 3 is a fundamental diagram of said device.

The device shown in FIGURE 3 comprises a central memory unit ME of the matrix-type including columns and lines having respectively connected thereto a sampling shift register or question register PQ and a sampling shift register or pupil register PE. Each pupil has a desk such as E1 (E2, . . . E$n$) provided with a hand-operated or manual answer selector switch which, under the control of a programming unit CP, is connected to the central memory unit ME. A program selector switch mounted in the teacher's desk PP is connected to said programming unit, which is in turn connected, through logical circuits, to each of the components of the teaching-aid device. The output terminals of the memory unit ME are connected to a data-processing unit consisting of an equality detector CR, a comparing and valuing unit ER and a counting unit Co, the output of the latter being connected to a display system AF by means of which the various types of data, viz pupil answers, teacher answers and marks can be read.

The operation of this device is as follows:

When he chooses to apply the "checking routine," the teacher moves his program selector switch mounted on his desk PP, to the adequate position. He then puts a question to the pupils as a whole and each pupil shifts the answer selector switch mounted on his desk, such as E1, to the position corresponding to the answer he deems appropriate, wherafter the teacher causes the process to start. Then, the programming register CP will so control the sampling register PQE (writing) and PEE (writing) that the answer of the number one pupil to the question put is recorded in the memory element corresponding to the first question and first pupil, that the answer of the second pupil to the same question is recorded in the memory element corresponding to the first question and second pupil, and so on, until the answer of the last pupil is registered, all the answers of the class being then recorded along one column of the memory (ME).

The programming unit CP will thereafter control the registers PQL (reading) and PEL (reading) so as to effect a sequential reading of the data contained in said column. Said data are directed to the equality detector CR, which receives on the other hand the answer which the teacher is to consider. Each identity between the pupil answers and the teacher answer will trip the counting circuit Co, whereof the content will be subsequently displayed in circuit AF, at the same time as the content of memory ME, i.e. at the same time as the pupil answers.

When the teacher chooses to apply the "general questioning routine," he moves his program selector switch on his desk PP, to the adequate position. Then, the teacher puts a first question and the pupils have to estimate or value the proposed answer and to show by moving his answer selector switch his appreciation of said answer. The teacher starts the process and, as in the preceding case of the "checking routine," the various answers are sequentially recorded in one single column. The question register PQE is moved one step further, so as to record the answers to the new question of the teacher, while the pupil register (PEE), which has come back to position I, successively scans all the positions corresponding to every pupil, until the last answer is recorded. The programming unit CP causes the same operation to be repeated in the same manner until memory ME is full.

To make the stored answers available, the teacher locates his program selector switch at the position "results," this initiating the sequential, line-by-line, reading process. For the purpose of assigning one mark to each pupil, each of the answers recorded along one line is, on the one hand, compared with the corresponding teacher's answer and, on the other hand, weighed in the valuing and weighting unit ER. This valuing-weighting circuit controls a pulse generator (not shown) which feeds to the counting unit Co a number of pulses proportional to the weight assigned to the answer under consideration. Then, the output unit AF is adapted to display all the answers of the first pupil and the mark awarded thereto. The process is resumed with the sequential extraction of the answers of the second pupil, all of which being recorded along the second line of the central memory unit, the comparison between the pupils' and the teacher's answers, the weighting, counting and display of the results of this pupil. Once all the answers have been extracted from the memory and displayed in unit AT, the device is definitely stopped.

Figure 1:
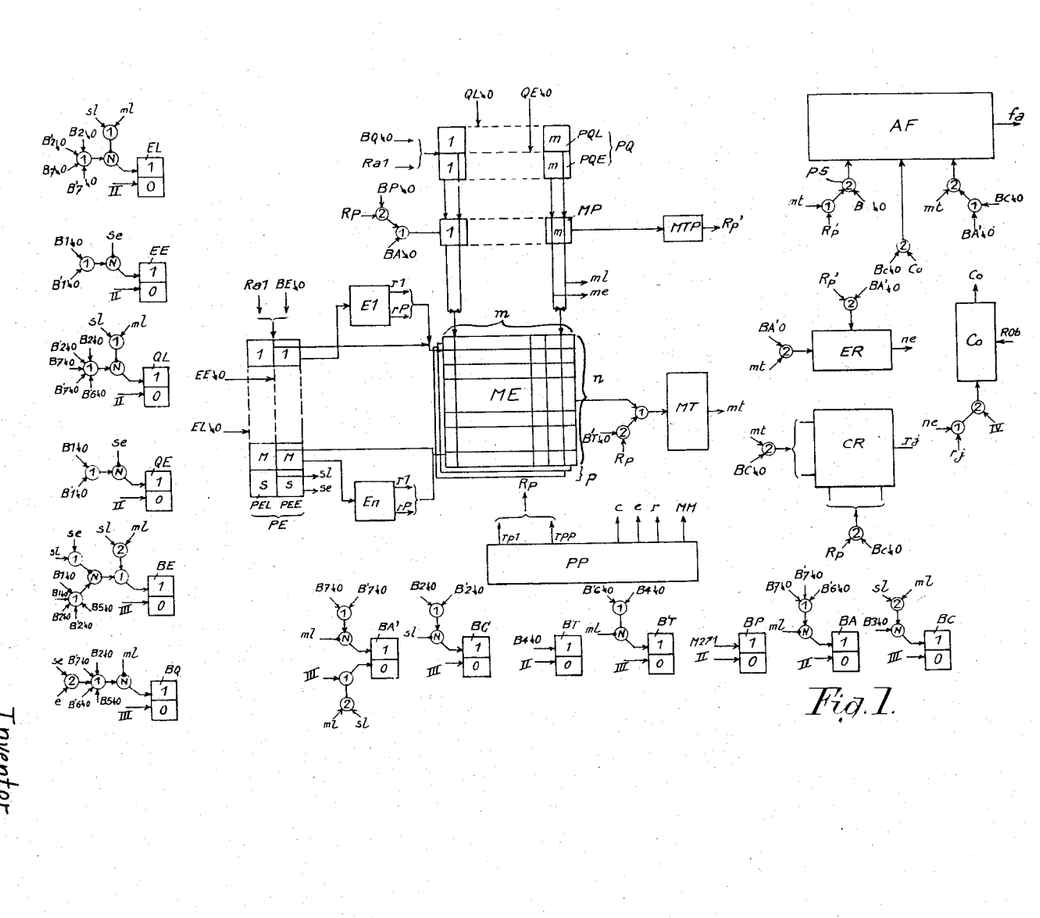
FIGURES 1 and 2 show details of circuits which may be used to embody the device according to the invention.
Figure 2:
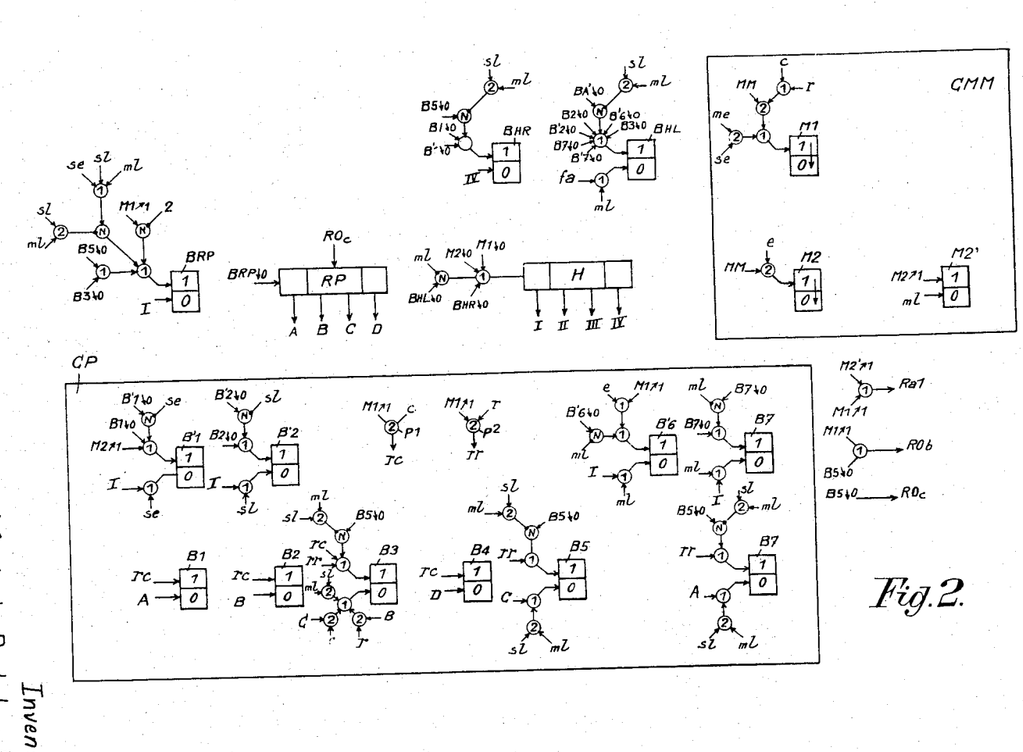

FIGURES 1 and 2 constitute in combination a more complete diagram of the device. To avoid any entanglement in the drawing, the logical circuits are without references; to understand the operation of the said device, as described hereinafter, it will be assumed that:

(1) The logical circuits represented by circumferences of small diameter are logical circuits of the OR type if these circles are assigned the numeral 1 and logical circuits of the AND type if these circles are assigned the numeral 2 or more, according to the number of conditions which cause them to be conductive;

(2) The inhibiting circuits, also represented by circumferences of small diameter are assigned the letter N, the blocking condition being illustrated by a segment ending in a point on said circumference;

(3) The monostable circuits are represented by a rectangle having two compartments which correspond to the two possible states of said circuits, an arrow common to both of said compartments illustrating the function of returning to the stable state, viz the zero state;

(4) The bistable circuits are represented by a rectangle having two compartments which correspond to the two possible stable states of said circuits;

(5) The shift registers are represented by rectangles having a number of compartments equal to that of positions which said registers may assume;

(6) Each control pulse is shown with reference to the bistable or monostable circuit which generated it and is followed by an arrow directed downwards or upwards and by a 0 or a 1, according to the case whether the the control occurs by change from the state 1 to the state 0 or conversely, respectively.

The device shown in FIGURES 1 and 2 includes:

A teacher desk PP (FIG. 1), the teacher having at his disposal one answer selector switch (not shown) which respectively sets up one of the conditions $rp1 \ldots rpp$ ($p$ possible aggregate answers which are expressed by $Rp$, a datum representative of the kind of the answer given) and one of the conditions $o$, $e$ or $r$ which correspond to the "checking," "general questioning" and "result" routines respectively, the routines $e$ and $r$ being successively set up for a general questioning; the teacher also has at his disposal a starting button (also not shown) which, when operated, supplies the pulse MM;

$n$ pupil desks $E1 \ldots En$ (FIG. 1), each provided with an answer selector switch (not shown) which sets up one of the conditions $r1 \ldots rp$, according to the control exerted, the condition set up representing the answer given by the pupil and the mechanical design of the selector switch (an example of a suitable switch being described in U.S. patent application 512,115 to Jean Borne, filed Dec. 7, 1965, and assigned to a common assignee) being such that one single answer can be made to any particular question;

Two sampling registers PE and PQ (FIG. 1) each having a reading stage PEL and PQL and a writing stage PEE and PQE, respectively. The register PE has a number of positions equal to the number of pupils, plus one output position. The register PQ has a number of positions equal to the number of questions contemplated for the "general questioning routine." Both registers PE and PQ resume position 1 under the control of pulse $Ra1$; under the control of pulses BE↘0 and BQ↘0 respectively, they advance from the position they momentarily assume to the next position. The pulses EE↘0 and QE↘0 control the transfer of a coincidence writing pulse to the position then assumed by stages PEE and PQE, respectively; the pulses EL↘0 and QL↘0 control the transfer of a coincidence reading pulse to the position then assumed by stages PEL and PQL, respectively;

A memory circuit ME (FIG. 1) adapted to record the answers of different pupils to the different questions, said circuit including $n$ lines and $m$ columns (each line being capable of including as many memory elements as are necessary for recording, one answer among $p$ possible answers, either coded or not). The memory unit is a magnetic core memory and operates by coincidence of current. One column wire and one line wire pass through each core. A current pulse, the amplitude of which is equal to half the switching current for the core, is passed through each wire. The read and write pulses are of opposite polarity. A sense line is also passed through the core to allow extraction of data therefrom.

A teacher memory circuit MP (FIG. 1) having $m$ positions;

A quality detector CR (FIG. 1) adapted to compare successively the teacher's answer to the answers of the $n$ pupils and to set up a $rj$ conditions when the two data are identical;

A comparing and valuing circuit ER (FIG. 1) adapted to value successively, with respect to the answer stated by the teacher, those given by the various pupils and to supply a data $ne$ as a function of the valuing step;

A counting circuit Co adapted to count either the number of correct answers to a question for the aggregate pupils (conditions $rj$), or the aggregate mark awarded to a pupil for his answers to $m$ questions (successive data $ne$). The datum Co supplied by the counter is forwarded to:

A display circuit AF (FIG. 1) adapted to display the results obtained by the pupils either in the "checking routine" or in the "general questioning routine";

Two sets of bistable circuits EL, EE, QL, QE, BE, BQ and BA', BC, BT, B'T, BP, BA, BC (FIG. 1), the operation of which controls that of two sampling registers PE and PQ, and that of the other circuits of the device, respectively;

A programming circuit CP (FIG. 2) consisting of a set of bistable circuits, the operation of which causes the marking of the successive steps of the various programs, according to the selected routine;

A programming register RP (FIG. 2) having four positions, since the most intricate routine comprises four programs. A bistable control circuit BRP is associated with said programming register;

A clock H (FIG. 2) having four positions, since every operating cycle of a program comprises four elemental phases. Two bistable circuits BHR and BHL are associated to said clock;

Finally, a starting circuit CMM consisting of two sets M1 and M2, M2'. The circuits H1, M2 are monostable circuits, while circuit M2' is a bistable circuit.

The operation of the device is as follows:

*"Checking routine" operation*

The teacher first moves the routine selector switch and the answer selector switch of his desk PP to the checking position (condition $c$), and to the position corresponding to the correct answer, respectively, and then actuates the starting button, thereby giving rise to pulse MM (FIG. 1).

In conjunction with condition $c$, pulse MM switches the monostable circuit M1 to state 1, through the logical circuits associated therewith (FIG. 2).

The resulting pulse M1↗1 causes:

The feeding of a pulse RO$b$ acting to restore to the zero state or reset the counting circuit Co (FIG. 1);

The switching to state 1 of the bistable circuit BRP, through the inhibiting circuit (since condition $e$ is not prevailing at this time) and through the associated OR circuit (FIG. 2).

The pulse M1↗1 also returns to the registers for pupil-by-pupil and question-by-question sampling PE and PQ to their respective starting positions, i.e. in position 1 (FIG. 1); at the same time, the AND-type logical circuit of the programming circuit CP becomes conductive under condition $c$ and the resulting pulse $rc$ causes the changeover to position 1 of the monostable circuits B1, B2, B3 through the associated OR circuit, and B4.

As the monostable circuit M1 is reset to zero, the resulting pulse M1↘0 causes, through the associated OR circuit, the starting of clock H, which will then produce a pulse I marking the outset of the first elemental phase of the first sub-program under control. Said first sub-program corresponds to the recording of the answer given by the first pupil.

The pulse I switches the bistable circuit BR back to the zero state. The function of circuit BRP is to cause, at each of its change-over from position 1 to position 0, the advance of the programming register RP. At this stage of the operation, the pulse BRP↘0 fed to the input of said register will therefore result in the output pulse A at the first position.

The pulse A resets to the zero state the bistable circuit B1 of the programming circuit CP.

The function of the bistable circuits B1, B2, ..., B7 is to denote the circuits of the device which define the various programs and sub-programs of the operating cycle.

The bistable circuit B1, which has just been switched, should allow the first pupil's answer to be recorded. Since this sub-program is common to all the $n$ pupils, it will have to be repeated $n$ times. So as to be capable of storing this particular sub-program, the bistable circuit B1 is paired with the complementing bistable circuit B'1, adapted to change to position 1 under the control of pulse B1↗0, through the associated OR circuit.

Pulse B1↗0 will also cause:

The switching to state 1, through the associated OR circuit, of the bistable circuit BHR controlling the clock H (FIG. 2);

The switching to state 1, through the associated OR circuit and inhibiting circuit (condition $se$ being not present at this time), of the bistable circuit EE associated with the stage EE (writing stage) of the pupil-by-pupil sampling register PE (FIG. 1);

The switching to state 1, through the associated OR circuit and inhibiting circuit (condition *se* being not present at this time) of the bistable circuit QE associated with the stage PQE (writing stage) of the question-by-question sampling register PQ;

The switching to state 1, through the associated OR circuit and inhibiting circuit (conditions *sl* and *ml* being not present at this time), of the bistable circuit BE controlling the advance of the pupil-by-pupil sampling register PE.

Clock H will then supply pulse II which denotes the outset of the second elemental phase of the prevailing sub-program. As a result, the bistable circuits EE and QE are reset to zero, and the resulting pulse EE$\searrow$0 and QE$\searrow$0 control the feeding of two recording coincidence pulses at the positions 1 of the writing stages PEE and PQE, respectively. These coincidence pulses are applied to the pupil memory circuit ME, through the answer selector switch of the pupil desk E1, along the first line and directly on to the first column.

The pupil memory circuit ME comprises several memory planes of the matrix-type with lines and columns. Each memory plane corresponds to one letter or character of the recorded word, forming the answer of the pupil or accessorily of the teacher. It is thus possible to record one answer among *p* possible answers supplied by each pupil. However, the data are preferably recorded in said circuit ME in a binary coded form, so as to reduce, in a known manner, the number of memory planes.

Thus, the answer of the first pupil to the question put by the teacher is by now recorded. The pulse II resets the bistable circuit BE to zero. The resulting BE$\searrow$0 pulse causes the advance of the pupil-by-pupil sampling register, which thus moves to position 2.

The pulse IV, which denotes the outset of the fourth elemental phase supplied by clock H, resets the bistable circuit BHR (FIG. 2) to zero and the resulting pulse BHR$\searrow$0 initiates a second operating cycle of said clock.

As noted above, the function of the bistable circuit B'1 is to complement that of bistable circuit B1. In fact, it will be appreciated, at this stage of the operation, that the program previously set forth by the bistable circuit B1 has to be repeated *n* times for the *n* pupils of the class, i.e. that the programming register RP should not progress at this time, while the steps previously caused by the switching of bistable circuit B1 to position 0 must be repeated.

The pulse I provided by the clock H, which defines the first elemental phase of the second sub-program under control, while being then without any effect on the bistable circuit BRP, which remained in the zero state, will however cause the resetting to zero of the bistable circuit B'1, through the associated OR circuit.

The resulting pulse B'1$\searrow$0 returns to state 1 the bistable circuit B'1, through the associated OR circuit and inhibiting circuit (since the inhibiting condition *se* is not present then) and the thus provided B'1$\searrow$0 pulse causes the switching to state 1 of the bistable circuits EE, QU and BE and also of the bistable circuit BHR. The device is therefore in the conditions required for recording the second pupil's answer (resetting to zero of the bistable circuits EE and QE, under the control of pulse II), for the advancing of the register PE to the third position (resetting to zero of the bistable circuit BE, under the control of pulse III), and for a third operating cycle of clock H (resetting to zero of the bistable circuit BE, under the control of pulse III), and for a third operating cycle of clock H (resetting to zero of the bistable multivibrator BHR under the control of pulse IV).

The just described operation is repeated *n* times to provide for the recording of the *n* pupils' answers, the pulse III of the *n*th operating cycle of clock H shifting the pupil-by-pupil sampling register PE to position *s*.

As described in the preceding cases, the pulse I emitted by the clock H, during the operating cycle corresponding to said position *s*, will switch the bistable circuit B'1 first to the state 0, then to the state 1, this causing a further switching to the state 1 of the bistable circuits EE, QE and BE. The pulse II, produced by the clock, restores the bistable circuits EE and QE to the state 0 this giving rise, at the position *s* of the writing stage PEE, to a pulse *se*. This pulse *se* results in:

The resetting to zero of the bistable circuit B'1, but the resulting pulse B'1$\searrow$0 is at this time inoperative to switch said bistable circuit to the state 1, since under the then prevailing inhibiting condition *se*, the inhibiting circuit is locked. It will be noticed that the pulse *se* acts to lock the inhibiting circuits associated with the bistable circuits EE and QE and that the latter remain in the 0 state;

The change-over to state 1 of the bistable circuit BRP, since the conditions *sl* and *ml* are not simultaneously present at this time.

By restoring the circuit BE to the 0 state (pulse B'1$\searrow$0), the pulse III causes the register PE to return to position 1.

Finally, pulse IV resets the bistable circuit BHR to zero and the clock H initiates the first operating cycle of the second program of the "checking routine," by supplying the pulse I which denotes the outset of the first elemental phase of this operating cycle. As a matter of fact, pulse I acts to reset the multivibrator BRP to zero and the resulting pulse BRP$\searrow$0 gives rise to a pulse B at the second position of the programming register RP.

The pulse B resets the bistable circuit B2 of the programmer CP (FIG. 2) to zero and the resulting pulse B2$\searrow$0 causes:

The switching to state 1 of the bistable circuit B'2, which plays a part similar to that of the bistable circuit B'1 (complement to B2).

The switching to state 1 of the bistable circuits EL, QL and BE,

The switching to state 1 of the bistable circuit BC (FIG. 1),

The switching to state 1 of the bistable multivibrator BHL.

The pulse II resets the bistable circuits EL and QL to zero and the resulting pulses EL$\searrow$0 and QL$\searrow$0 are respectively fed to the reading stage PEL and PQL, each of which supplies, at its respective position 1, i.e. at the first row and first column of the pupil memory circuit ME, a coincidence reading pulse, so that the datum contained in this first row, across the column, is fed to the transfer memory circuit MT.

Pulse III causes, on the one hand, the advance of the sampling register PE to position 2 (under the control of pulse BE$\searrow$0, as previously) and, on the other hand, the resetting to zero of the bistable circuit BC.

At this time, the logical circuits associated with the circuit CR become conductive, with the result that, on the one hand, the datum *mt* contained in the transfer memory circuit MT (and which corresponds to the first pupil's answer) and, on the other hand, the datum from the teacher's answer selector switch RP (which corresponds to the correct answer) are fed to the aforesaid comparison circuit. The datum *mt* is moreover fed to the display circuit AF, under the control of pulse BC$\searrow$0. Pulse IV is fed to the counting circuit Co, through the logical circuits associated therewith, under the condition *rj*, which is provided by the comparison circuit CR if the first pupil's answer is identical with that of the teacher.

Once the first pupil's answer has been displayed in the circuit AF, the latter produces a display-end pulse *fa* which controls the resetting to zero of the bistable circuit BHL, through the associated OR circuit, the resulting pulse BHL$\searrow$0 initiating the second operating cycle of the clock for the sub-program involved (condition *ml* being not present at this time).

The pulse I which defines the outset of the first elementary phase of this second operating cycle resets the bistable circuit B'2 to zero and the pulse B'2\0 will again switch said bistable circuit to the state 1 (condition *sl* being not present at this time).

The pulse B'2\0 then switches the bistable circuits EL, QL, BE, BC to the state 1, this ensuring, according to the just described process, the display of the second pupil's answer, the comparison thereof with the teacher's answer and the possible counting of a second pulse in the counting circuit Co, should the said second pupil's answer be identical with the teacher's answer. This process is repeated *n* times for the *n* pupils in the class and, at the elementary phase defined by the pulse III of *n*th operating cycle of the clock, the sampling register PE moves to position *s*.

The pulse I of the clock operating cycle which corresponds to said position *s* causes the resetting to zero of the bistable circuit B'2, which will resume state 1 as previously described and the bistable circuits EL, QL, BE and BC are also switched to state 1. The pulse II results in a pulse *sl* provided by the reading stage PEL at the position *s* thereof, under the control of pulse EL\0 and said pulse *sl*, which resets the bistable circuit B'2 to zero, acts to lock the inhibiting circuit associated to stage 1 of the said bistable circuit, which therefore remains in the state 0; at the same time, the pulse *sl* switches the bistable circuit BRP to the state 1, in the same manner as pulse *se* did in the preceding program, since conditions *sl* and *ml* are not simultaneously present at this time. The pulse III restores the sampling register PE to position 1, by means of pulse BE\0, and resets the bistable circuit BC to zero; but the pulse BC\0 is without effect, since no transfer has occurred from the pupil memory circuit ME to the transfer memory circuit MT. Therefore, no counting pulse is transferred to the counting circuit Co.

By the end of program B, the answers of the *n* pupils have been displayed in the circuit AF and the number of correct answers has been counted in the circuit Co.

Once the display circuit AF has produced the pulse *fa* which marks the end of the operating cycle associated with position *s* of the reading stage PEL, the bistable circuit BHL is reset to zero and the clock H initiates the first operating cycle of the next program. The pulse I which defines the first elementary phase of said operating cycle resets the bistable circuit BRP to zero and the BRP\0 pulse results in a pulse C at the third position of the programming register RP. The pulse C resets to zero the bistable circuit B3 of the programming circuit CP. The program C, during which the datum contained in the counting circuit Co, is transferred to the display circuit AF (display of the aggregate number of correct answers for all the pupils in the class), includes no sub-program. Consequently, the bistable circuit B3 is not duplicated, the pulse B3\0 switching directly the bistable circuit BRP to the state 1 and, at the same time, the bistable circuit BC associated with the counting circuit Co and circuit BHL also to the state 1.

The elementary phase II is not provided in this program and the pulse III, which marks the outset of the third elementary phase, causes the datum contained in the counting circuit Co to be transferred to the display circuit AF, under the control of pulse BC\0 (the bistable circuit BC being reset to zero under the control of pulse III). When either the aggregate number of correct answers for all the pupils, or the datum contained in the counting circuit Co has been displayed, then the circuit AF supplies the display-end pulse *fa* and the bistable circuit BHL is reset to zero. The pulse BHL\0 initiates the operating cycle corresponding to program D, the pulse I of this cycle resetting the bistable circuit BRP to zero, and the pulse BRP\0 results in a pulse D at the fourth position of the programming register RP.

The pulse D resets the bistable circuit B4 to zero and the resulting pulse B4\0 switches the bistable circuits BT and B'T to the state 1.

The pulse II, which marks the outset of the second elementary phase of the operating cycle corresponding to the program D, resets the bistable circuit BT to zero. The resulting pulse BT\0 causes the transfer of the teacher's answer R*p* to the transfer memory circuit MT.

The following pulse III resets the bistable circuit B'T to zero and the resulting pulse B'T\0 controls the display of the datum *mt*, contained in the circuit MT, on to circuit AF. Once the display is completed, the display-end pulse *fa* is without effect on the bistable circuit BHL, since the latter has not been operated by the circuit B4 of the programming circuit CP; the clock H is not re-started and the device stops.

Subsequently to this test, the display will therefore show the teacher what are the pupils' answers and, opposite thereto, the number of supplied answers which are identical with that which the teacher is to consider.

*Operation in the "general questioning routine" mode*

The teacher, having moved the routine selector switch and answer selector switch on this desk PP to the general questioning position (condition *e*) and to the position corresponding to the correct answer to the first question, respectively, operates the starting button, this resulting in pulse MM.

In conjunction with the condition *e*, the pulse MM switches the monostable circuit M2 (FIG. 2) to the state 1.

The resulting pulse M2/1 switches the bistable circuits M2' and B'1 to the state 1 and initiates the first operating cycle of the clock H.

The pulse M2/1, resulting in pulse R*al*, will restore the sampling registers PE and PQ to position 1 and, as in the preceding case (program A of the checking routine), the following steps are caused to occur:

The clock H provides the pulse I which resets the bistable circuit B'1 to zero, while the pulse B'1\0 immediately returns said circuit to the state 1;

The bistable circuits EE, QE and BE are changed over to the state 1.

Moreover, the bistable circuit BP is switched to the state 1, under the control of pulse M2/1.

The following steps, during which the *n* pupils' answers to the first question are caused to be recorded, are identical to those described above with respect to the program A of the checking routine; the pulse II supplied by the clock H causes this recording in the first column of the pupil memory circuit ME, under the control of the bistable circuits EE and QE being reset to zero; the pulse III causes the sampling register PE to progress, under the control of the bistable circuit BE being reset to zero, and the pulse IV initiates a further operating cycle of the clock H, under the control of the bistable circuit BHR being reset to zero (after being switched to the state 1 under the control of B'1\0).

However, during the first operating cycle of said clock, the pulse II also resets to zero the bistable multivibrator BP, and the resulting pulse BP\0 will cause, by the current-coincidence method, the teacher's answer R*p* to be recorded in the first stage of the teacher memory circuit MP (FIG. 1) then denoted by the sampling register PQ.

While the *n*th pupil's answer to the first question is being recorded, the sampling register PE is moved to position *s*. As described above for the program A of the checking routine, the pulse *se* supplied at phase II resets the bistable circuit B'1 to zero, preventing it to be switched to the state 1, and the clock H which has reached its fourth position stops. However, said pulse *se*, jointly with condition *e* set in by means of the teacher's desk, switches the bistable circuit BQ to the state 1 (FIG. 1).

The following pulse III resets said bistable circuit to zero and the resulting pulse BQ$\searrow$0 causes the question-by-question sampling register PQ to move to position 2, while register PE is at this moment moved back to position 1 under the control of BE$\searrow$0.

The $n$ pupils' answers to the second question are recorded in accordance with the just described process, after the teacher has moved his answer selector switch to the position which corresponds to the correct answer to the second question and has again operated the starting button MM.

However, for this second and for the further questions, only the monostable circuit M2 is again operated, since the bistable circuit M2' is already in the state 1 and is inoperative to bring the register PQ back to position 1, as in the preceding cases.

While the recording of the pupils' answers to the $n$th question is being effected, the pulse II, which marks the outset of the second elementary phase supplied by the clock during its operating cycle related to the first pupil, results in a pulse $me$. This pulse $me$ has no effect at this time. However, upon production of the pulse II, denoting the outset of the second elementary phase supplied by the clock during its operating cycle which corresponds to the position $s$ of the sampling register PE, the pulse $me$ will, jointly with pulse $se$, cause switching of the monostable circuit M1 to the state 1. The bistable circuit BRP is not operated, since the inhibiting circuit therefor is then locked by condition $e$ (general questioning). However, the pulse M1$\nearrow$1 switches the bistable circuit B'6 to the state 1, through the AND circuit therefor.

The following pulse III effects the resetting to zero of the bistable circuits BE and BQ, which were initially switched to the state 1, at the phases I (B'1 1) and II ($se$ and $e$), respectively. (At phase II, pulse $se$ also caused the bistable circuit B'1 to resume the zero state, while preventing its further switching to the state 1).

Finally, the following pulse IV resets the circuit BHR to zero and the clock starts the first operating cycle of the second program in the general questioning routine, said second program being set forth by the bistable circuit B'6 of the programming circuit CP (FIG. 2). The pulse I which is supplied by the clock H during this first operating cycle causes the resetting to zero of the bistable circuit B'6 (which is immediately restored to state 1, under the control of pulse B'6 0, since condition $ml$ is not then present).

The pulse B'6 causes:

The switching to state 1 of the bistable circuits QL and BL,

The switching to state 1 of the bistable circuits B'T and BA, since condition $ml$ is not present at this time, The switching to state 1 of the bistable circuit BHL.

The pulse II causes the bistable circuits QL and BA to resume the state 0 and the resulting pulses QL$\searrow$0 and BA$\searrow$0 bring about, through the sampling circuit PQ then in position 1, the reading of the datum previously recorded in stage 1 of the teacher memory circuit MP. This datum is fed to the circuit MTP, wherein it is temporarily recorded, and is representative of the teacher's answer to the first question of the questioning process. It will be noticed that the coincidence reading pulse which is simultaneously fed to the first column of memory ME is inoperative since no pulse is supplied at this time by the sampling register PE.

The following pulse III results:

On the one hand, in the resetting to zero of the bistable circuit BQ, the resulting pulse BQ$\searrow$0 causing the register PQ to advance to position 2, On the other hand, in the resetting to zero of the bistable circuit B'T, the B'T$\searrow$0 pulse (FIG. 1) causing the $Rp'$ datum (teacher's answer to the first question) to be directed to the display circuit AF.

Once the display of said answer is completed, the circuit AF supplies a pulse $fa$ whereby the bistable circuit BHL is reset to zero. The clock H then starts the second operating cycle of the relevant program.

The successive answers supplied by the teacher and recorded in the circuit MP are displayed in the circuit AF, in the just-described manner.

When the $n$th operating cycle of the clock is under control, the sampling register PQ is in position $m$ and the pulse II causes the $n$th teacher's answer to be transferred to the circuit MTP, through a pulse $ml$.

This pulse $ml$ resets the bistable circuit B'6 to zero, while its presence at the input of the inhibiting circuit for stage 1 prevents said bistable circuit to resume the state 1.

The pulse $ml$ also resets the bistable circuit BHL to zero. However, the pulse BHL$\searrow$0 will not start any further operating cycle of the clock H, since the associated inhibiting circuit is then locked by pulse $ml$. The pulse III of this last operating cycle resets the bistable circuits BQ and B'T to zero; the register PQ is moved back to position 1, the teacher's answer to the last question of the questioning process is transferred to the display circuit, then the device stops.

*Operation in the "result routine" mode*

The teacher moves his program selector switch to the position "results" (condition $r$), then operates the starting button on this desk, this providing pulse MM. The latter switches the monostable circuit M1 to state 1.

The bistable circuits B3, B5, B7 are switched to state 1, this occurring under the control of pulse $rr$ supplied by the AND-type logical circuit P2 which is made conductive by condition $r$ and pulse M1$\nearrow$1.

The bistable circuit BRP is also switched to state 1 and the pulse M1$\searrow$0 which results from the resetting to zero of the monostable circuit M1 starts the first operating cycle of the clock H, pertaining to the first program of the "result routine." It will be noticed that pulse M1$\nearrow$1 has also reset the counting circuit Co to zero.

The pulse I which marks the outset of the first elementary phase of the first clock operating cycle resets the bistable circuit BRP to zero and the pulse BRP$\searrow$0 brings about a pulse A at the first position of the programming register RP. Said pulse A resets the bistable circuit B7 to zero and the pulse B7$\searrow$0 causes:

The switching of the bistable circuit B'7 to the state 1,

The switching of the bistable circuits EL, QL, BQ to the state 1,

The switching of the bistable circuit BHL to the state 1,

The switching of the bistable circuits BA' and BA to the state 1.

The pulse II, which results in the pulses EL$\searrow$0, QL$\searrow$0 and BA$\searrow$0 at the inputs of the sampling registers PE, PQ, and of the circuit MP, brings about, on the one hand, the reading of the first pupil's answer and, on the other hand, the reading of the teacher's answer, to the first question.

The first datum is fed to the transfer memory circuit MT and the second datum to the transfer memory circuit MTP. The following pulse II, which results in the pulses BQ$\searrow$0 and BA'$\searrow$0 causes, on the one hand, the sampling register PQ to advance to position 2 and, on the other hand, the data $mt$ and $Rp'$ (previously recorded in circuits MT and MTP) to be transferred to the comparing and valuing circuit ER (FIG. 1) through the logical circuits associated therewith. At the same time, the datum $mt$ is fed to the display circuit AF.

The circuit ER is adapted to compare and value or estimate the mark to be allotted to the pupil in accordance to the answers supplied to the same question by said pupil and by the teacher. In this respect, two possible processes are to be contemplated for the "general questioning" and "result" routines; said processes have been set forth hereinabove and are recalled hereunder:

(1) The first process which was not dealt with in the lay out of this stage of the operation, consists in putting to the pupil $m$ successive questions, each attended by $p$ possible answers supplied by the teacher, said process being similar to that used in the "checking" routine. In this case, the data $mt$ and $Rp'$ are fed to the circuit CR and the output datum $rj$, supplied by said circuit CR when the pupil's answer is correct, will allow the pupil to be allotted a partial mark (or a zero-mark where the datum $rj$ fails to be supplied). The circuit ER is then unnecessary and the pulse IV, following the pulse III which operated the comparing circuit CR, ensures the transfer of the mark to the counting circuit $Co$.

(2) The second process, which was dealt with in the foregoing, consists in putting to the pupil $m$ questions whereto the teacher words one single proposed answer, either correct or wrong, each pupil having to select one of four answers, viz.

(a) the proposed wording is correct,
(b) the proposed wording is wrong,
(c) the proposed wording is probably correct,
(d) the proposed wording is probably wrong.

It will then suffice to assign to each of the first positions, for example, of the pupil's answer selector one of the four references just-specified, in the same sequential order, while of course the teacher's selection is limited to the first two positions of his answer selector switch. In this case, it is possible to estimate the mark allotted to a pupil as a function of the answer supplied by the latter, according to predetermined mark-allotment rules or standards; the valuing circuit ER used in this case will supply a datum $ne$, for example in the form of one, two, three or zero pulses which will be collected in the counting circuit $Co$, under the control of plane IV.

Once the first pupil's answer to the first question of the questioning process has been displayed, the circuit AF then supplies pulse $fa$, the bistable circuit BHL is reset to zero and the clock H starts the second operating cycle of the program, under the control of pulse BHL$\searrow 0$ fed through the associated inhibiting circuit (since condition $ml$ is not prevailing then).

The pulse I provided by the clock resets to zero the bistable circuit B'7, which will immediately resume the state 1 under the control of pulse B'7$\searrow 0$ and through the associated inhibiting circuit (condition $ml$ being not present then).

The pulse B'7$\searrow 0$ operates the same circuits as were previously operated by pulse B7$\searrow 0$.

During this second operating cycle, the answers of the first pupil and the teacher to the second question are caused to be read by pulse II (EL$\searrow 0$, QL$\searrow 0$ and BA$\searrow 0$); the pulse III causes the transfer of said answers to the comparing and valuing circuit ER and the pulse IV controls the transfer to the counting circuit $Co$ of the mark allotted to the pupil. The datum $mt$, i.e. the pupil's answer, is displayed in the circuit AF and, when the display is completed, the latter supplies the pulse $fa$. The bistable multivibrator BHL is reset to zero, the clock initiates a third operating cycle, while the bistable multivibrator BQ has been reset to zero under the control of pulse III and the sampling register PQ having consequently assumed its third position. When the clock starts the $n$th operating cycle which involves the reading, display and mark allotment relating to the last answer of the first pupil, then pulse II causes the $ml$ to appear at the output of the sampling register PQ. The bistable circuit BRP is restored to the state 1, the bistable circuit B'7 is reset to zero, but cannot be restored to the state 1 since the inhibiting circuit therefor is locked; the circuit BHL is reset to zero, but does not operate the clock H, since at this time the associated inhibiting circuit is locked by said pulse $ml$.

The pulse II of course also causes the pupil's and teacher's answers to the $n$th question to be transferred into the circuits MT and MTP.

The following pulse III resets the bistable circuit BA' to zero; the data $mt$ and $Rp'$ are transferred to the comparing and valuing circuit ER and, at the same time, the pulse BA'$\searrow 0$ switches the bistable circuit BHL back to the zero state. In this manner, once the aggregate mark valued by the circuit ER has been transferred to the counting circuit $Co$ under the control of pulse IV, then the pulse $fa$, supplied by the circuit AF at the end of the display of the first pupil's answer to the $n$th question, starts the first operating cycle of program B of the "result" routine for the first pupil.

It will be appreciated that the bistable circuit BHL was operated unnecessarily during the last-decribed operating cycle of the clock, this operation being provided for in the "checking routine" and "general questioning routine" modes, but remaining without effect in the "result routine" mode.

The clock H is again operated and the pulse I supplied thereby resets the bistable circuit BRP to zero the resulting pulse BP$\searrow 0$ giving rise to pulse B at the second position of the programming register RP. The pulse B resets the bistable circuit B3 to zero. As described above with respect to the program C of the checking routine, the pulse B3$\searrow 0$ switches the bistable circuit BC to the state 1 and the pulse III of the relevant operating cycle of the clock H, which results in pulse Bc$\searrow 0$, causes the datum contained in the counting circuit $Co$ to be displayed in circuit AF. This datum is representative of the aggregate mark allotted to the first pupil for the various answers he supplied. Once the display is completed, the pulse $fa$ causes the resetting to zero of the bistable circuit BHL which was previously switched to the state 1 under the control of B3$\searrow 0$. The clock H is re-started and provides pulse I which causes the resetting to zero of the bistable circuit BRP, which was also previously switched to the state 1 under the control of B3$\searrow 0$. The pulse BRP$\searrow 0$ gives rise to a pulse C at the third position of the programming register RP and the bistable circuit B5 is reset to zero.

The program C of the "result" routine involves no recording, reading or display step, but does only bing about a re-starting of the device for the purpose of recording the results obtained by the second pupil. Consequently, the pulse B5$\searrow 0$ causes the switching to the state 1 of the bistable circuits BE, BQ, BRP and BHR, B7, B5 and B3 and the movement of the programming register RP back to its first position (the fourth position remaining unemployed in the "result" routine). The pulse III provided by the clock H causes the register PE to move to position II and the sampling register PQ to move back to position I (the last position used of said register being position $m$). The following pulse IV resets the bistable circuit BHR to zero; the clock H is re-started and provides pulse I; the bistable circuit BRP is reset to zero and the pulse BRP$\searrow 0$ gives rise to a pulse A at the first position of the programming register RP. The bistable circuit B7 is reset to zero and the operation described above with respect to the first pupil is repeated for the second pupil.

When the display of the answers and mark pertaining to the $n$th pupil is completed, the sampling register PE is in position $s$. This position $s$ is not related to any line of the memory, so that no datum is transferred to the display circuit. However, register PQ will progress up to its $n$th position. The pulse II pertaining to the $n$th operating cycle of the clock H, whereat the sampling register PE is in position $s$, causes pulses $sl$ and $ml$ to appear simultaneously.

At this time:

The circuit BRP, which is normally switched to state 1 under the control of either of said pulses $ml$ or $sl$ will remain in the zero state, due to the fact that the associated inhibiting circuit will be locked by the two pulses simultaneously applied thereto.

As described hereinabove, the bistable circuit B'7 is reset to zero under the control of pulse $ml$, but the same pulse acts to lock the associated inhibiting circuit and the pulse B'7$\searrow 0$ has no effect.

The bistable circuit BA' then in the state 1 (since it is normally operated by pulse III) resumes the state 0 under the control of pulses *sl* and *ml*. On the other hand, pulse *ml* switches the bistable circuit BHL back to the state 1, while being, as previously set forth, without effect on the clock H. Under normal conditions, the pulse BA'↘0 would switch the bistable circuit BHL again to the state 1; however, at the present time, the simultaneous pulses *ml* and *sl*, which have reset the bistable circuit BA' to zero, have locked the associated inhibiting circuit, so that circuit BHL remains in the zero state On the other hand, the bistable circuits B3 and B5 have previously been switched to the state 1 (pulse B5↘0 supplied at the end of the preceding operating cycle). Thus, these circuits will be reset to zero by pulses *sl* and *ml*, but the resulting pulses B3↘0 and B6↘0 are without effect on the bistable circuits normally operated thereby, since the aforesaid conditions simultaneously act to lock the inhibiting circuits by means of which to lock the inhibiting circuits by means of which the said bistable circuits are controlled.

Finally, the bistable circuit BE is switched to the state 1 by the simultaneous feeding of the pulses *ml* and *sl* through the associated AND-type logical circuit or gate.

When the following pulse III is provided by the clock, the circuits BE and BQ are reset to zero and the resulting pulses BE↘0 and BQ↘0 restore the sampling registers PE and PQ to position 1. The system is stopped and is in the required condition for being subsequently re-started.

It should be understood that the above description was made by way of non-restrictive example and that various changes thereto may be contemplated without departing from the scope of the invention.

Thus, for example, provisions may be made to allow the teacher to choose, during a general questioning routine, either the "checking routine" mode (*p* possible answers whereof one is correct) or the mode herein dealt with (four possible answers to a proposed wording which may be correct or wrong).

For this purpose, it suffices to provide the routine selector switch with one additional position adapted to bring about the transfer—under the relevant sub-program—of the teacher's and pupil's answers to the equality-detector and comparison circuit CR, instead of the comparing and valuing circuit ER.

A further modification may also be contemplated for the purpose of extending the capacity of the teaching-aid device. This consists in splitting up along several consecutive lines the display of the results obtained by the pupils in a class, whenever the maximum number of answers to be printed along one line is beyond the capacity of the physical base or medium.

The components are identical to those of the device according to the fundamental concept of the invention. The storing of the answer given by all the pupils to one question occurs as previously described, the so-called pupil shift register having a number of stable positions equal to the number of pupils. The reading of one column of the memory unit will then include a number of steps equal to the number of lines required in the physical medium to display all the answers.

Each reading step in said column of the memory unit is completed by a partial display of the results on the said physical medium and by the starting of the following result reading step.

What I claim is:

1. An electric teaching device comprising in combination a teacher desk, a plurality of pupil desks, a plurality of registers and a result reading unit, said teacher desk being provided with a multi-position manual answer selecting means, said means allowing the teacher to select an answer from a plurality of proposed answers to a question put to the pupils, each said pupil desk being provided with a multi-position manually operated answer selecting means, one said register being a question register of the step-by-step shifting type having one input and a plurality of outputs whereof only one output may be energized for each incoming signal, a pupil register of the step-by-step shifting type having one input and a plurality of outputs whereof only one output can be energized for each input signal, a central memory unit formed of a plurality of memory cells among which those necessary for recording the answers of every pupil to the same question comprise a corresponding "section" of cells and those necessary for recording the answers of a single pupil to a plurality of questions comprise a group of cells, said central memory unit is of the matrix type comprising columns and lines and in which said equality detector is connected by means of the programming unit to each of the memory cells of one section of the central memory unit in a first mode of operation called checking routine during which the answers of the pupils are read, and is connected by means of the programming unit to each of the memory cells of one group of the central memory unit in a second mode of operation called general questioning routine during which the answers of the corresponding pupil are read, each section of memory cells being a column, each group of memory cells being a line of said memory unit, means connecting each cell to one of the outputs of the question register and to the output of a pupil register and to the answer selector switches, an equality detector for comparing each pupil answer with the answer of the teacher and for supplying an indication of identity therebetween, means for connecting said equality detector through said pupil registers and said question registers to the memory unit and to the answer selector switch at the teacher desk, means for comparing and valuing the pupil answer with the teacher answer and for supplying as a function of this comparison a weighted indication of the value of the pupil answer, means for connecting said comparing and evaluating means through the question register and the pupil registers to the cell group which receives the answers of the teacher on the one hand and the cell groups that receive the pupil answers on the other hand, a programming means for sequentially controlling the various stages of transfer and conversion of the data, means connecting said programming means to the multiplicity of said memory units, registers, and the equality detector.

2. A device according to claim 1 in which the comparing and valuing means includes a weighing stage connected to a generator, the latter generating at least one pulse according to the results of the comparison, the output of said generator being connected to a unit adapted to count said pulses.

3. A device according to claim 1 further comprising a display unit connected by means of the programming unit to the memory cells corresponding to the pupil answers on the one hand and the counting unit which counts the number of identities between the pupil answers and the homologous teacher answer on the other hand during said checking routine, and said display unit being initially connected to the memory cells corresponding to the teacher answer and subsequently to every element of the memory unit and to the output terminal of a counting unit which stores the mark assigned to each pupil during the general questioning routine.

4. A device according to claim 3 adapted to supply, in the checking routine mode, on the same line of a physical base provided on the display unit, a maximum number of answers which is less than the total number of pupils wherein the memory cells belonging to the same column are grouped into subsections each of which comprises at most a number of memory cells equal to the maximum number of answers on one line of said physical base taking into account each of said subsections of the column, each cell of one common subsection being connected on one hand to the column of the detector which is in turn connected to the counting unit and on the other hand to the display unit to display thereon only the result contained in said subsection, the connection between the counting and display units for the display of the total number of equalities between the teacher answer and the pupil answers occurring only when the reading has been completed up to the last cell of the last subsection involved.

5. An electrical teaching aid device comprising in combination a teacher desk provided with a multi-position selector switch to allow the teacher to select an answer from among a corresponding multiplicity of possible answers proposed to a question put to the pupils, a plurality of pupil desks each provided with a multi-position answer selecting switch for allowing each pupil to select the correct answer from among the multiplicity of possible answers, a display unit, a central memory unit provided with a plurality of memory cells referred to by means of two corrdinates called question and pupil coordinates respectively, first and second pluralities of driving means, every question coordinate being individually connected to one of the first plurality of driving means and every pupil coordinate being individually connected to one of said second plurality of driving means, said central memory unit recording the positions of the pupil and the teacher selector switches, a question register of the shifting type provided with a multiplicity of outputs corresponding to the number of questions put to said pupils, said question register being selectively energized so that only a single output is energized at any one time to indicate by its relative position the question put to the pupils, each of said question register outputs being connected one by one to every one of said first driving means corresponding to the question coordinates, a pupil register of the shifting type provided with a plurality of outputs corresponding to the plurality of pupils, said pupil register being so constructed that a single output is energized at each time and indicates by its relative position the pupil whose answer is to be recorded in said central memory unit, every output of said pupil registers being connected one by one to every one of said driving means corresponding to said pupil coordinates, a writing-reading unit connected to said plurality of driving means, said unit allowing the writing in and reading out of said memory cells provided in said memory unit, a sensing unit connected to each of said memory cells for receiving the recorded answers that are read out, an equality detecting means for comparing each pupil answer with the corresponding teacher answer and for supplying an indication of the identity therebetween, connections being provided for connecting said equality detector to said sensing unit on the one hand and to said answer selector switch placed on said teacher desk on the other hand, a comparing and evaluating unit for comparing said pupil answer with the corresponding teacher answer and for supplying as a function of the comparison a weighted indication of the value of the pupil answer, means for connecting said comparing and evaluating unit to memory cells through said sensing unit for recording the pupil answers and the teacher answers, a control unit for sequentially controlling the steps of the transfer and processing of data, means connecting said control unit and said registers and units.

6. An electrical teaching aid device comprising a teacher desk having a multiposition selector switch for allowing the teacher to select a position corresponding to the correct answer from among a multiplicity of possible answers proposed to a question put to the pupils, a plurality of pupil desks, each said pupil desk being provided with a multi-position answer selecter switch for allowing each pupil to select an answer, a display unit, a central memory unit provided with a plurality of memory cells referred to by means of first and second coordinates called question and pupil coordinates respectively, first and second pluralities of driving means, every question coordinate corresponding one by one to every one of said first driving means and said pupil coordinates corresponding one by one to every one of said second driving means, said central memory unit recording the answers of the pupils and the teacher, a question register of the shifting type provided with a multiplicity of outputs corresponding to the multiplicity of questions that are put to the pupils, only one of said outputs being energized at a time and said energized output indicating by its relative position a serial number of the question put to the pupils, every said question register output being connected one by one to every one of said first driving means, a pupil register of the shifting type provided with a multiplicity of outputs corresponding to a multiplicity of pupils, only one of said outputs being energized at any time and indicating by its relative position the serial number of the pupil whose answer is to be recorded in said central memory unit, every said pupil register output being connected one by one to every one of said second driving means, a reading-writing unit connected to both said driving means allowing writing in and reading out of said memory cells provided in said cell unit, a sensing unit connected to every one of said memory cells and receiving the recorded answers that are read out, an equality detector comparing each pupil answer with the corresponding teacher answer in a first mode of operation called checking routine in which said equality detector is sequentially electrically coupled by means of a control unit through said sensing unit to each memory cell according to the pupil answers referred to by a question coordinate, a comparing and evaluating unit for comparing said pupil answer with the corresponding teacher answer which in a second mode of operation called general questioning is sequentially electrically coupled by means of said control unit through said sensing unit to each memory cell recording said pupil answers unit to each memory cell recording said pupil answers referred to by a pupil coordinate, said control unit being provided in order to control the various steps of the transfer and processing of the data connections between said control units, said registers, and said units.

7. An electrical teaching aid device including a teacher desk provided with a selector switch having a multiplicity of positions for allowing the teacher to select an answer from among a corresponding multiplicity of possible answers put to the pupils, a plurality of pupil desks each provided with a multi-position answer selector switch for allowing each pupil to select an answer, a display unit, a central memory unit provided with a plurality of memory cells referred to by means of first and second coordinates, called question and pupil coordinates respectively, first and second pluralities of driving means, every question coordinate corresponding one by one to every one of said first driving means and every pupil coordinate corresponding one by one to every one of said second driving means, said central memory unit allowing the recording of the answers of said pupils and said teacher, a question register of the shifting type provided with a multiplicity of outputs corresponding to the multiplicity of questions that are put to said pupils, only one of said outputs being energized at any one time and when energized indicating by its relative position the serial number of the question put to the pupils, every output of said question register being connected one by one to every one of said first driving means, a pupil register of the shifting type provided with a multiplicity of outputs equal to the number of pupils, only one of said outputs being energized at any one time and indicating by its relative position the serial number of the pupil whose answer is to be recorded in said central memory unit, every output of said pupil register being connected one by one to every one of said second driving means, a writing-reading unit connected to both said driving means allowing writing in and reading out of said memory cells provided in said central memory unit, a sensing unit connected to every one of said memory cells and receiving the recording answers that are read out, an equality detector for comparing each pupil answer with the corresponding teacher answer and supplying an indication of identity therebetween, means for connecting said equality detector to said sensing unit and to said answer selector switch, a comparing and evaluating unit for comparing each pupil answer with the corresponding teacher answer, said comparing and the evaluating unit including a weighing stage connected to a generator which generates at least one pulse according to the result of the comparison, the output of said generator being connected to a unit adapted to count said pulses, a control unit for sequentially controlling the various steps of transfer and processing of the data, means interconnecting said control unit, said registers, and said units.

8. An electrical teaching device including a teacher desk provided with a selector switch having a multiplicity of positions, a plurality of pupil desks each provided with a multi-position answer selector switch, a central memory unit provided with a plurality of memory cells referred to by means of first and second coordinates called question and pupil coordinates respectively, first and second pluralities of driving means, every question coordinate corresponding to one by one of said first driving means and every pupil coordinate corresponding one by one to every one of said second driving means, said central memory unit allowing the recording of the answers of the pupils and the teacher, a question register of the shifting type provided with a multiplicity of outputs corresponding to the multiplicity of questions that are put to the pupils, only one of said outputs being energized at any one time and indicating by its relative position the serial number of the question put to the pupils and every output thereof being connected one by one to said first driving means, a pupil register of the shifting type provided with a multiplicity of outputs corresponding to the multiplicities of pupils, only one of said outputs being energized at one time and indicating by its relative position the serial number of the pupil whose answer is to be recorded in the central memory unit and every output thereof being connected one by one to said second driving means, a writing-reading unit connected to both said driving means allowing the writing and reading of said memory cells, a sensing unit connected to each said memory cell and receiving the recording answers read out therefrom, an equality detector for comparing each pupil answer with the corresponding teacher answer and for supplying an indication of identity therebetween, means provided for connecting said equality detector to said sensing unit on one hand and said teacher answer selector on the other hand, a comparing and evaluating unit for comparing said pupil answer with the corresponding teacher answer and for supplying as a function of this comparison an indication of the value of said pupil answer, means connected through said sensing unit, said comparing and evaluating unit, to the memory cells recording the pupil answers on one hand and the memory cells recording the answers of the teacher on the other hand, a control unit for sequentially controlling the various steps of transfer and processing of the data, electrical connections between said control unit and said registering units, a display unit connected by means of said control unit which in a first mode of operation, called the checking routine, to the memory cells corresponding to the pupil answers on one hand and to a counting unit which counts the number of identities between the pupil answers and the corresponding teacher answers, and which in a second mode of operation, called a general questioning routine, is initially connected to the memory cells recording the teacher's answers and subsequently to the memory cells referred to by a like pupil coordinate and said counting unit which assorts the mark assigned to each pupil.

9. An electrical teaching aid device comprising in combination, a teacher desk provided with a multi-position selector switch, a plurality of pupil desks each provided with a multi-position answer selector switch, a central memory unit provided with a plurality of memory cells referred to by means of coordinates called question and pupil coordinates, driving means connected to each said coordinates, said central memory unit recording the answers of said pupils and said teachers, a question register connected to the driving means corresponding to the question coordinates, said question register, when energized, indicating the serial number of the question put to the pupils, a pupil register of the shifting type, said pupils register, upon energization, indicating the serial number of the pupil answer to be recorded in the central memory unit, the output of said pupil register being connected to the corresponding pupil coordinates, a reading-writing unit connected to said driving means and allowing for the reading in and writing out of said memory cells, a sensing unit connected to each said memory cell and receiving the recorded answers that are read out, an equality detector comparing each pupil answer with the corresponding teacher answer and for supplying an indication of the correlation therebetween, said detector being connected between said sensing unit and the answer selector switch at the teacher desk, a comparing and evaluating unit for comparing said pupil answer with the corresponding teacher answer and supplying as a function of the comparison a weighted indication of the value of the pupil answer, said unit being connected between the memory cells recording the teacher answers, a control unit for sequentially controlling the various steps of transfer and processing of the data, said control unit being connected between said registers and units, a display unit having first and second modes of operation, said first mode of operation called a checking routine and being adapted to display on a physical base provided in said display unit a number of pupil answers greater than the maximum number of positions on the same line as the physical base wherein the memory cells referred to by a question coordinate are grouped in sections the contents of which are displayed one after the other, each of said sections comprising at most a number of memory cells equal to the maximum number of writable positions the line of said physical base, each memory cell of one common section being connected to a counting unit and to a display unit to thereby display on said physical base only the results contained in said said section, a connection between the counting unit and the display unit for the display of the total number of identities between pupil answers and the teacher answers occurring only when the reading of the central memory unit has been completed up to the last memory cell of the last section involved.

References Cited

UNITED STATES PATENTS

| | | | |
|---|---|---|---|
| 2,527,469 | 10/1950 | Vernon et al. | 32—22 |
| 2,654,163 | 10/1953 | Reynolds | 35—9 |
| 2,738,595 | 3/1956 | John et al. | 35—48 |
| 3,186,109 | 6/1965 | Brinton | 35—9 |
| 3,187,443 | 6/1965 | Schure et al. | 35—9 |

EUGENE R. CAPOZIO, *Primary Examiner.*

R. W. WEIG, *Assistant Examiner.*